BISTABLE MAGNETIC DEVICE AND METHOD

Filed April 28, 1960 2 Sheets-Sheet 1

ERIC T. K. CHOW
ANTHONY J. KOLK, JR.
INVENTORS
BY Louis A. Kline
John J. Matlago
ATTORNEYS

BISTABLE MAGNETIC DEVICE AND METHOD

Filed April 28, 1960 2 Sheets-Sheet 2

ERIC T. K. CHOW
ANTHONY J. KOLK, JR.
INVENTORS

BY Louis A Kline
John J. Mathago
ATTORNEYS

United States Patent Office 3,183,492
Patented May 11, 1965

3,183,492
BISTABLE MAGNETIC DEVICE AND METHOD

Eric T. K. Chow, Los Angeles, and Anthony J. Kolk, Jr., Rolling Hills, Calif., assignors to The National Cash Register Company, Dayton, Ohio, a corporation of Maryland Filed Apr. 28, 1960, Ser. No. 25,317
7 Claims. (Cl. 340—174)

This invention pertains to improvements in magnetic devices and methods of producing the devices; and more particularly the invention pertains to improved bistable magnetic devices suitable for information-storage applications, and to methods of producing the bistable magnetic devices.

In application of Donal A. Meier, Serial No. 728,739, filed April 15, 1958, abandoned in favor of continuation-in-part application Serial No. 795,934, filed February 27, 1959, there is disclosed a bistable magnetic device comprising a filamentary or rod-like non-conductive base upon which is plated a magnetic coating of material consisting essentially of a large proportion of iron and a minor proportion of nickel. The rod-like base of that device is of small transverse dimension of the order of from ten to twenty mils diameter, and the finished magnetic device provides a bistable magnetic "core" which may either be wound with, or be inserted into, very small solenoid coils of the order of a tenth of an inch length or less, whereby there is provided a very advantageous bistable information-store unit having very low switching-time and other desirable mechanical and electromagnetic characteristics. In the production of the thus briefly described bistable magnetic rod-like devices, difficulty has been experienced in producing large numbers of the devices having uniformly alike electrical and electromagnetic characteristics. Uniformity of the magnetic devices is extremely desirable, so that the electrical apparatus employed in conjunction with the devices in an information-processing system may be constructed with greater latitude or wider tolerances while remaining capable of producing satisfactory results in operation of the system. According to the teaching of the aforementioned patent application, an acceptable mode of producing the magnetic devices comprises carefully cleaning the filamentary base or rod (which preferably is of glass), sensitizing the rod, reducing in situ on the rod a very thin substrate of an electrically-conductive material such as silver, carefully cleaning the silvered rod, and electro-plating onto the silver substrate a thin adherent film or layer of iron-nickel material of closely controlled composition and thickness. The electrical and magnetic characteristics of the device thus produced vary in accordance with many parameters; for example, upon specific composition of the iron-nickel plated deposit, upon the thickness of the deposit, upon the roughness of the silver substrate, the cleanliness with which operations are conducted, the physical dimensions of the several components of the device, the crystalline nature of substrate, etc. Thus it has been impossible to correlatively control all of the parameters so as to consistently produce successive groups or "batches" of the magnetic rods or devices having susbtantially the same characteristics. This difficulty has been overcome by the present invention, and in addition, a desirable magnetic characteristic has been further improved and an undesirable magnetic characteristic has been reduced in value; whereby bistable magnetic devices having improved and uniform characteristics may be consistently and surely produced.

It has been found that the improvements in uniformity of magnetic characteristics are gained as the thickness of the silver substrate is reduced, but only to the point or stage where the substrate is not uniformly conductive over the areal extent of the substrate and that there apparently is an optimum value of surface roughness of the silver substrate below and above which the final magnetic characteristics of a completed device suffer degradation.

Also it has been determined that there apparently is an optimum value of exposed active surface area of the silver substrate upon which the magnetic material is to be deposited; increasing the area exposed, while maintaining the optimum value of surface roughness, resulting in improved magnetic characteristics and also causing great improvements in consistency and uniformity of those characteristics from batch to batch of the produced devices. Studies of electron micrographs of replicas of substrate surfaces, coupled wtih studies of measurements of substrate surface areas as determined by electrical capacitance measurements, have indicated that a substantial increase of effective surface area may be secured coincidentally with decrease of surface roughness to an optimum value, by operations according to the present invention. Irrespective of the accuracy of the conclusions drawn from the studies, the improved procedures do provide a significant improvement over the best of the magnetic rod-like devices previously produced, and when followed provide consistently uniform devices of excellent quality.

Briefly, the preferred form of improved magnetic device according to the present invention includes a stiff resilient base of copper-beryllium alloy or glass or the like, bearing an adherent substrate composed essentially of an electrically conductive composition comprising mercury and a metal such as silver, and an outer adherent layer or film of bistable magnetic material composed essentially of a large proportion of iron and a minor proportion of nickel. Another form of base may be a plate-like member of glass, metal, or the like, presenting either a continuous or a discontinuous surface upon which the conductive substrate and outer layer of magnetic material may be successively deposited. The improved procedure of producing an electroplated bistable magnetic layer or film on a substrate structure having an electrically conductive surface, includes essentially the step of treating the conductive substrate structure with a solution which causes a modification of the structural characteristics of the conductive surface whereby a subsequently electroplated deposit or film of magnetic material has uniform and improved magnetic characteristics. The solution comprises an ion complex which in a short period of time causes inclusion of metallic mercury in the conductive surface. The complete preferred procedure comprises cleaning the base, sensitizing an exposed surface of the base (with stannous chloride for a silver substrate), rinsing, reduction in situ on the base of a layer of metallic silver from mixing sprays of silver-containing solution and a reducing solution, rinsing, dipping in a solution containing mercuric cyanide ion complexes, rinsing, addition by electroplating of a coating of iron-nickel material, rinsing, drying, and application of a protective coating of an insulative non-magnetic material.

From the preceding brief outline of the features characterizing the invention, it is evident that principal objects of the invention are to provide a bistable magnetic rod-like device having magnetic characteristics superior to those of similar devices therebefore produced, and to provide improvements in processes of producing bistable magnetic coatings.

Another object of the invention is to provide an improved procedure for making bistable magnetic information storage devices.

An additional object of the invention is to provide a rod-like bistable magnetic device possessing magnetic characteristics superior to previously-known rod-like bistable magnetic devices.

Other objects and advantages of the present invention will hereinafter be made evident in the appended claims and description of a preferred exemplary embodiment of physical structure and procedure of making the structure as illustrated in the accompanying drawings.

Figure 11:
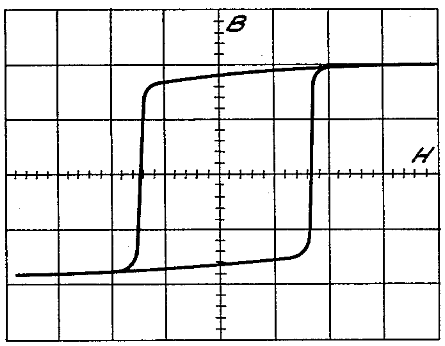
FIGS. 11 and 12 are copies of a magnetization curve and a switching output diagram, respectively, produced by oscillographic means, using a magnetic device produced by previously used procedures.
Figure 13:
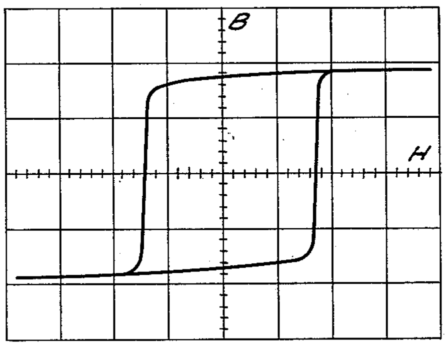
Figure 12:
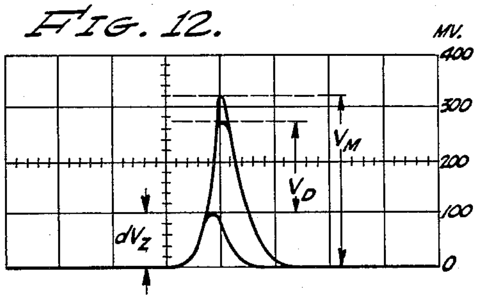
Figure 14:
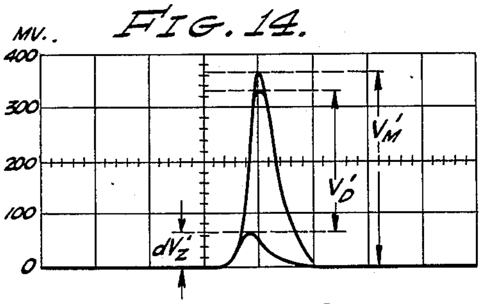
Figure 15:
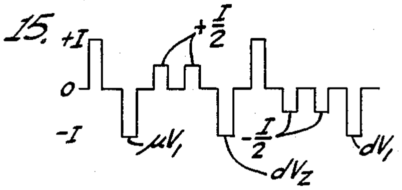

FIGS. 13 and 14 are copies of a magnetization curve and a switching output diagram, respectively, produced under the same conditions and by the same means used to produce the comparable curve and diagram of FIGS. 11 and 12, but using a magnetic device produced by procedures according to the present invention; and FIG. 15 is a graphical representation of a repetitive series of electric current pulses applied to drive windings linked to the magnetic elements used in deriving the data graphically presented in FIGS. 12 and 14.

Figures 1, 2:
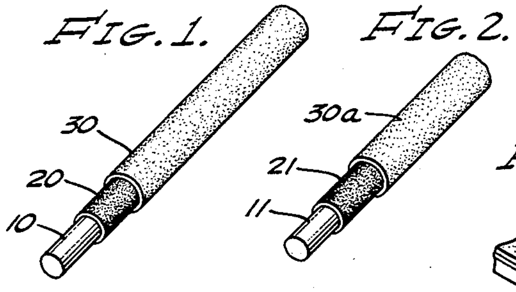
FIG. 1 is a pictorial view of a fragment of a sensitized base member bearing a surficial adherent coating of a selected substrate and a coating of magnetic material overlying and adherent to the substrate, the substrate and magnetic coating being shown exaggerated and partly removed to facilitate illustration.
FIG. 2 is an enlarged pictorial representation of a fragment of a second type of a rod-like base member or filament bearing a substrate and a magnetic coating similar to those depicted in FIG. 1, with portions removed, the substrate and coating being exaggerated as to thickness.

Referring to FIG. 1, there is depicted in grossly enlarged form an electrically non-conductive base member 10 bearing an adherent electrically conductive non-magnetic substrate or film 20 comprising a minor proportion of mercury and a major proportion of another metal such as silver, and upon which reposes a firmly adherent layer of magnetic material 30. The film 20 and layer of magnetic material 30 are shown grossly exaggerated for purposes of illustration, but are in the actual apparatus very thin. For example, the conductive film 20 is produced by repeated depositions in situ of a non-magnetic material composed principally of an electrically conductive metal such as silver, and is produced as thin as is practicable while still providing substantially uniform electrical conductivity over the substrate-covered area. The thickness of the layer of magnetic material 30 may be, for example, of from about 1500 A. to 5000 A. in thickness. The substrate film 20 and the overlying magnetic material are applied by procedures hereinafter explained, whereby the magnetic material has an exceptionally acceptable B vs. H or magnetization curve (that is, a high $B_R/B_M$ ratio) for binary digital data store applications and provides desirably low "zero disturb" output characteristics when inductively coupled to electrical conductors or "windings" in manners now well known in the art.

In FIG. 2 there is depicted an alternative type of base member, 11, in the form of a stiff resilient rod of electrically conductive material such as copper-beryllium alloy, with an adherent substrate film 21 of a non-magnetic electrically conductive material comprising a minor proportion of mercury and a major proportion of another non-magnetic metal such as silver, the substrate bearing a firmly adherent thin layer of bistable magnetic material *30a* applied by electro-plating from an electrolyte comprising iron and nickel salts.

Since the procedures and materials utilized in producing the devices depicted in both of FIGS. 1 and 2 are similar, a single description and elucidation of procedures and formulas will be set forth for the devices, with differences noted where necessary.

As a base-member material for the device depicted in FIG. 1, glass is preferred since it is readily produced in the desired shape or form and size, and since it is stiff whereby any possible degradation of magnetic characteristics due to stressing of the device are minimized. Other suitable stiff resilient base materials may be used for this species of device, for example, quartz and rigid resilient synthetic resins or the like upon which a conductive substrate according to the invention may be deposited. As indicated in the procedural tabulation, hereinafter set out, the base member 10 is first thoroughly cleaned as with a hot chromic acid bath or in an alkaline cleaner such as that readily obtainable under the trade name "Shipley's Alkaline Cleaner." The cleaning is followed by a thorough distilled water rinsing. During all of the procedural steps through the final rinsing, it is preferable to maintain the device in the wet state and to avoid contamination due to oxidation, $H_2S$ gas, etc. Hence it is preferable to maintain continuity of procedural steps without appreciable delay between steps. Following rinsing, the base member is preferably sensitized in preparation for deposition of the electrically conductive substrate. In the case of glass or quartz base members, sensitizing may be accomplished by immersion for from one to three minutes in a fresh warm stannous chloride solution prepared by dissolving 12 grams of $SnCl_2$ in 500 ml. of distilled $H_2O$ with sufficient concentrated HCl to completely prevent formation of stannous hydroxide. The sensitized and rinsed base member then has deposited in situ thereon a uniform film of metallic silver. The deposition may be accomplished in any suitable manner, but preferably is effected by reduction from concurrently applied sprays of diluted Peacock Concentrated Silver Solution and Peacock Concentrated Silver Spray Reducer, both of which are commercial products and are both available from Peacock Laboratories, Philadelphia, Pa. The preferred dilutions are: for the Silver Solution, 60 ml. per liter of water, and for the Reducer, 16 ml. per liter of water. The sprays are preferably applied by using $N_2$ gas as a driver, applied under 2 lbs. per square inch pressure on standard Johns Chromatographic Spray Bottles; and in the interest of uniformity it is preferable to traverse the base through the spray-mixing zone a plurality of times at increased speed, rather than by making a single slower pass through the spray. Only enough silver to produce an areally uniformly conductive layer should be reduced. Use of nitrogen gas as a spray driver is preferred, to lessen oxidation of the reduced silver. Immediately following the deposition of the silver the coated base is rinsed with distilled water and preferably is immediately thereafter immersed for a few (from five to thirty) seconds in an aged (at least one week old) mercuricyanide solution, either of $NaHg(CN)_3$ or of $KHg(CN)_3$, of concentration from about 0.1% to 1.0% and the dipped base then again rinsed with distilled water as indicated in step 8 of the following procedure tabulation.

*Preferred procedure*

(1) Clean base with alkaline cleaner or hot chromic acid.
(2) Rinse with distilled water.
(3) Sensitize by immersion in warm fresh stannous chloride solution for 1–3 minutes.
(4) Rinse with distilled water.
(5) Reduce silver in situ on base member.
(6) Rinse with distilled water.
(7) Immerse for 5 to 30 seconds in aged $NaHg(CN)_3$.
(8) Rinse with distilled water.
(9) Electroplate in Fe-Ni electrolyte.
(10) Rinse with de-ionized water and dry with acetone.
(11) Apply protective cover of urethane resin.

The immersion in the aged mercuric cyanide solution causes addition of a small amount of mercury to the conductive substrate material and in some manner reduces the roughness while increasing the effective exposed area of the substrate. Also, a small amount of the substrate is lost to the bath.

The electroplating is preferably carried out using an electrolyte consisting essentially of 290 grams of $FeCl_2.4H_2O$, 12 grams of $NiCl_2 \cdot 6H_2O$, and 238 grams $CaCl_2H_2O$, per liter of water solution, with addition of dilute HCl, if necessary, to bring the pH to a value of $1.00 \pm 0.05$. Enough iron powder or iron wool to render certain that the solution is ferrous rather than ferric may be added to the electrolyte or "bath." In an exemplary apparatus a base formed as a glass filament of 10 mils diameter, having a silver-mercury substrate produced as previously noted and outlined in the tabulated preferred procedure, is progressively passed through the electrolyte at room temperature with an exposure to the electrolyte of about 3 inches of the coated base, at a speed of about 5 inches per minute, with a plating current of from 12 to 25 milliamperes. Care should be exercised to apply the plating current uniformly over the length and periphery of the base; and this may be done by using a tubular or spiral anode electrode through which the base is traversed or drawn. The conductive substrate is connected as the cathode. Thus in this example the exposure of any small surface area of the substrate to the plating action is about ⅗ minute or 36 seconds. It should be noted that the time of exposure, current density, etc., may be varied somewhat, dependent upon the thickness of magnetic layer desired, it being evident that thin layers provide reduced switching output. Further, it is evident that for filaments or rod-like bases of other sizes, or bases of other configurations, the exposure time and current should be modified to accommodate the change in exposed area. The bistable magnetic material deposited by the electrolysis is found to be approximately 97% iron and 3% nickel by weight but variation of ±2% in the iron content may still provide acceptable magnetic devices.

Figure 5:
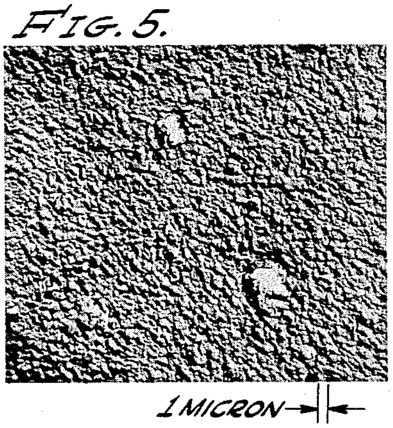
FIGS. 5, 6 and 7 are photo-reproductions of electron-micrographs of two-stage polystyrene-carbon replicas of surfaces presented by conductive substrates produced according to previously used procedures which did not comprise steps included in the process of the present invention, at degrees of magnification indicated below the figures.
Figure 8:
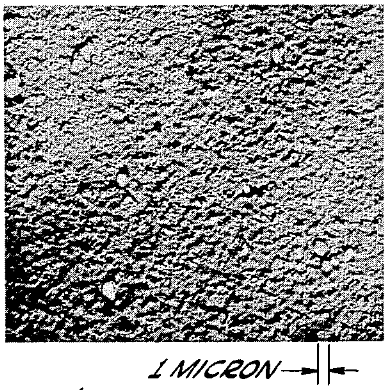
FIGS. 8, 9 and 10 are reproductions similar to those in FIGS. 5, 6 and 7, depicting comparable characteristics of conductive substrates following treatment according to procedural steps comprised in the process of the invention, at degrees of magnification indicated below the respective figures.
Figure 6:
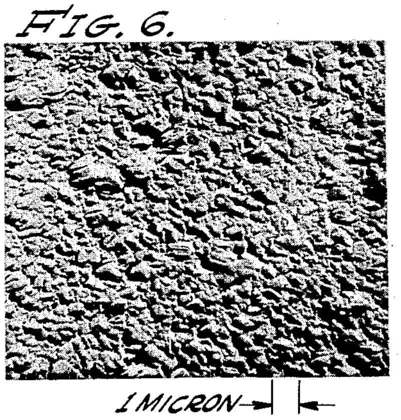
Figure 9:
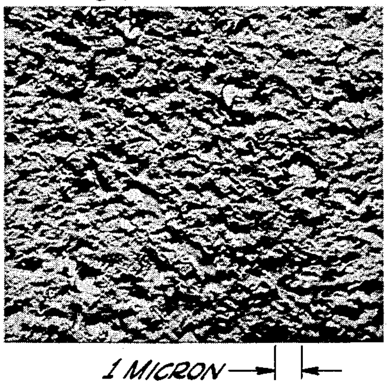
Figure 7:
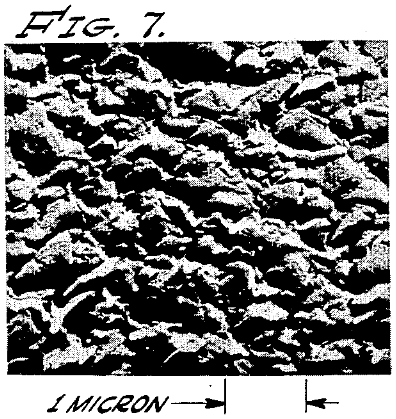
Figure 10:
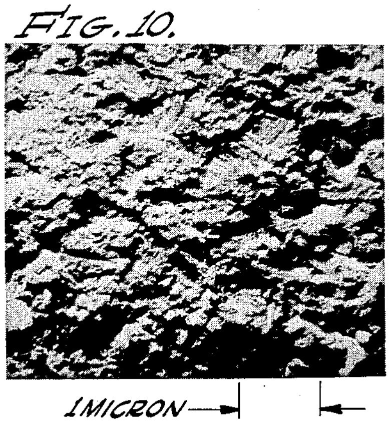

The effect of the cyanide dip comprised in step 7 of the tabulated procedure is to produce a modification of at least the surface of the substrate film, and the addition to the substrate of a small amount of mercury. The surface alternation is made evident by examination of FIGS. 5, 6 and 7 and FIGS. 8, 9 and 10, which now show photo-reproductions of electron micrographs of carbon-polyethylene two-state replicas of, respectively, a typical silver substrate according to the invention but prior to the cyanide dip of step 7, and a typical silver-and-mercury substrate according to the invention, the three views in each of the two groups having been obtained at magnifications indicated below the respective figures. Examination of FIGS. 5 and 8, obtained at 7100 diameters magnification, indicates an apparent change in surface roughness of the substrate. Careful measurement of the surface areas, using known capacitance measurement techniques, indicates an increase of actual surface area of the substrate due to the cyanide bath treatment, concurrently with an apparent reduction of surface roughness. This apparent increase in surface area may possibly be explained by the analogy afforded by a layer of large rocks overyling an area and presenting a certain exposed area and which when reduced to many small rocks then presents a much less rough surface but a greatly increased contact or surface area. The physical nature of the silver-mercury substrate resulting from the cyanide bath treatment is not easily determinable, but possibly the substrate is of the nature of an amalgam. A small amount of silver is lost to the cyanide bath, and the resultant substrate on an exemplary treated base comprised approximately 95% silver and 5% mercury, by weight. The fact that freshly prepared potassium or sodium mercurous cyanide solutions generally do not give the desired improved results indicates a probability that a complex ion must be formed in the cyanide solution prior to use; and accordingly step 7 of the procedure specifies immersion in an aged solution. Irrespective of what the exact physical nature of the final substrate thus produced actually it, it has been discovered that the substrate thus produced provides an electrode for electroplating which gives a large increase in uniformity of magnetic characteristics over the area of an electroplated base, with a considerable increase in the rectangularity of the magnetization curve and a resultant increase in usable signal in a sense winding inductively linked to the magnetic device when the magnetic state thereof is reversed. That is, there is a considerable increase in the difference between "first disturb" and "zero disturb" potentials when the magnetic device is employed as a binary information-store device. These improvements are hereinafter explained in connection with the graphs comprised in FIGS. 12–15.

In testing the characteristics of the magnetic devices, comparisons are valid only when the comparative tests are performed with the same testing apparatus, since there is no standard test apparatus. The previously noted improvements presented by magnetic devices according to the present invention are made evident by comparative tests performed under identical conditions and with the same apparatus, first upon the previously known magnetic devices as described in the aforementioned patent application and then upon a similar device according to the present invention. Following such tests in apparatus designed to simulate the actions within a data-processor "memory," the magnetic devices are used to replace the previously known similar devices in a magnetic data-storage matrix and the test results verified by practical operation. The results of the instrumental comparative tests are hereinafter explained, and subsequent practical tests in an operating memory matrix verified the improvements indicated in the comparative tests.

A test of the magnetic characteristics of a long length of magnetic rod-like device (of which short lengths of each of two varieties are shown in FIGS. 1 and 2) comprises slowly drawing the device through a test solenoid unit by means of which successive portions of the device are subjected to rapidly repeated sequences of positive and negative electromagnetic driving fields each sequence of which includs drives indicated by the driving-current waveform depicted in FIG. 15. Therein a drive of magnitude I is sufficient to drive the portion of the magnetic device inductively linked to the driving coil, from a remanent state in one polarity to a substantially saturated state in the opposite polarity. The $I/2$ or half-drives indicated correspond to the application to the magnetic core or device of only one of the two "coincident-current" driving efforts applied in a coincident-current selecting mode as practiced in reading storage units of a storage matrix. Thus with reference to FIG. 15 it may be noted that during a sequence of drives, the driving solenoid receives, for example, a substantially square-wave driving current pulse of duration about 0.25 microsecond in one direction, then a similar pulse in the opposite direction, followed in turn by a pair of half-current pulses in the same direction, and so on, through the sequence. The driving pulses are of substantially equal duration and may be spaced apart by suitable intervals, which intervals in the exemplary test were each of about two-hundred microseconds duration. Thus the successive portions of the magnetic device are alternately coerced first in a first direction or sense to one state or polarity, then in a second sense to the other or opposite state, then disturbed by coercive efforts insufficient to change the state but tending to do so, then coerced with a full strength field in the second direction or sense, then ceorced to the first polarity or state, etc. There is thus induced in an output or sense winding which encircles the drive winding and the magnetic device, a series of potentials which are graphically presented as oscillographic waveforms in FIGS. 12 and 14. The waveforms in FIGS. 12 and 14 were secured by operation of the same apparatus under identical conditions except that the waveforms of FIG. 12 were produced using a magnetic rod-like device of the previously known type while those of FIG. 14 were produced using a magnetic rod-like device according to the present invention.

Referring to the output signal or sense line signal waveforms depicted in FIG. 12, it is noted that three waveforms are superimposed, the sweep circuit of the oscilloscope having been adjusted at a rate, relative to the repetition rate of the driving pulses applied to the magnetizing coil, to effect this superposition. In the figure the highest waveform is that representing the potential ($V_M$) generated in the "sense" winding by the reversing driving pulse ($uV_1$ of FIG. 15) and the lowest waveform is that produced incident to application of the negative driving pulse of full strength or magnitude ($dV_Z$ of FIG. 15). The waveform of intermediate magnitude is that produced when the driving winding is driven by the negative pulse labeled $dV_1$ in FIG. 15. The difference between the higher and the intermediate waveform potentials is due to the fact that the magnetic state of the core (magnetic rod) device has been "disturbed" by the intervening half-drive or half-current positive pulses ($+I/2$). Since the lower waveform corresponding to $dV_Z$ does not represent a desired signal and falls in the class of "noise" signals, and since desired signals due to reversal of state of the device may fall as low in value as that indicated by the intermediate waveform, the value of the usable output may be stated or measured in terms of the difference potential, $V_D$. $V_D$, in FIG. 12, is of the order of 175 millivolts, and is representative of excellent magnetic rod devices produced prior to the present invention.

In FIG. 14 the waveforms are similar to those in FIG. 12 but produced in tests of a magnetic rod-like device according to the present invention. Comparison of the lower waveform of magnitude $dV_Z'$ (of approximately 64 millivolts) with the corresponding waveform of FIG. 12 shows a lower "disturb" potential, indicating an improvement in rectangularity of the magnetization loop or curve. Further, the potential produced by reversal of state of the improved magnetic device after having been disturbed, and shown by the waveform of intermediate magnitude in FIG. 14, is considerably greater than its counterpart in FIG. 12. That is, as indicated it is of about 56 millivolts greater magnitude. This increase in output signal voltage, combined with the additional usable signal resulting from decrease in the disturb signal, provides a usable signal, above noise level, of $V_D'$, which is of the order of 265 millivolts. The improvement over the corresponding usable signal of 175 millivolts ($V_D$) provided by the previous type of magnetic device is apparent.

Figure 4:
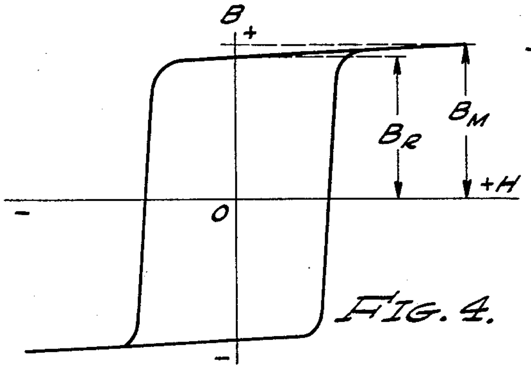
FIG. 4 is a graphical representation of magnetization characteristics of a bistable magnetic material, useful in explaining the invention.

Referring to FIG. 4, there is shown a magnetization curve illustrating the magnetization characteristics of a typical bistable magnetic material. The magnetic inductions B, produced by fields of strength H, are plotted for a complete cycle of repeated cycles of magnetization of the specimen. At a value of B equal to $B_M$ the magnetic material is magnetized in a first state substantially to saturation. That value is the value to which the material would be driven by the aforementioned drive of magnitude I. Upon decay of the driving field, the magnetic material returns to and remains at a first state remanent value indicated by the upper intercept on the B axis; and that leaves the material magnetized at a value $B_R$. The ratio $B_R/B_M$ is a measure of the "rectangularity" of the magnetization curve of the material. Reversal of the magnetizing field drives the material to the second or opposite magnetic state, providing the other half of the magnetization curve or loop, and upon decay leaves the material in a second remanent state. In FIGS. 11 and 13 there are shown reproductions of the magnetization curves of the two magnetic devices involved in the tests which provided the potential wave forms reproduced in FIGS. 12 and 14, respectively.

Figure 3:
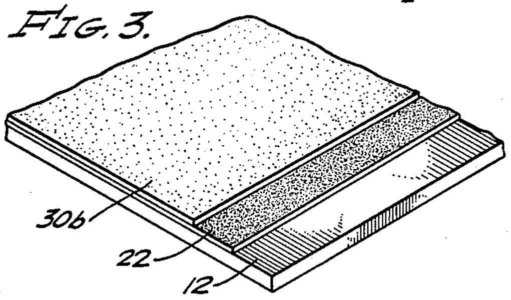
FIG. 3 is a view of another form of bistable magnetic device having applied films or coating according to the invention but showing a substrate and a magnetic film exaggerated in thickness.

In FIG. 3 there is depicted an alternative form of magnetic device according to the invention. Therein, a base 12, preferably but not necessarily of glass, is provided with a deposit 22 of the aforementioned silver-mercury composition, and an adherent electroplated deposit of nickel-iron composition overlies the silver-mercury substrate. The silver-mercury film is formed by deposition in situ from Silver Solution and Silver Reducer, concurrently sprayed as previously described. The magnetic overcoat 30*b* is electroplated onto the substrate using the same solutions and techniques as those previously explained.

In all forms of the magnetic device the magnetic material (30, 30*a*, 30*b*) is preferably but not necessarily unoriented, that is, without any particularly "easy" direction of magnetization. The magnetic film may, however, be given such an oriented characteristic, by any of the previously known procedures such as deposition in a magnetic field, deposition upon a strained base, or straining subsequent to deposition of the magnetic material.

Preferred forms and procedures according to the invention having been described in detail it is evident that modifications will thereby be suggested to those skilled in the art, and accordingly it is not desired that the invention be restricted to the specific forms disclosed but only by the appended claims.

What is claimed is:

1. A magnetic device comprising: a base member; a thin electrically-conductive substrate comprising essentially a major proportion of silver reduced in situ on a surface of said base member, and a minor proportion of mercury provided in said substrate by immersing the substrate in an aged mercuricyanide solution; and a thin layer of bistable magnetic material electro-deposited upon said electrically conductive substrate.

2. A magnetic device according to claim 1, said base member comprising essentially a stiff, resilient rod-like member.

3. A magnetic device according to claim 1, said bistable magnetic material comprising essentially a major proportion of iron of the order of from 95% to 99%, and a minor proportion of nickel of the order of from 5% to 1%, by weight.

4. A magnetic device according to claim 1, said base member comprising essentially a stiff, resilient electrically non-conductive filament.

5. A magnetic device according to claim 1, said base member comprising a glass filament.

6. A magnetic device according to claim 1, said base member comprising a stiff, resilient electrically non-conductive filament; and said bistable magnetic material comprising essentially nickel and iron in the proportion from 1% to 5% nickel and from 99% to 95% iron, by weight.

7. A magnetic device according to claim 1, said base member comprising essentially a stiff resilient glass rod of diameter of the order of from 10 mils to 20 mils; and said layer of bistable magnetic material being of thickness of the order from 1500 A. to 5000 A.

References Cited by the Examiner

UNITED STATES PATENTS

| | | | |
|---|---|---|---|
| 2,877,540 | 3/59 | Austen | 29—155.5 |
| 2,906,682 | 9/59 | Fohnoe et al. | 29—155.5 |
| 2,919,432 | 12/59 | Broadbent | 340—174 |
| 2,945,217 | 7/60 | Fisher et al. | 340—174 |
| 3,041,202 | 6/62 | Whitehurst | 117—71 |

OTHER REFERENCES

"Millimicrosecond Magnetic Switching and Storage Element," by D. Meir, Journal of Applied Physics, supp. vol. 30, No. 4, page 45S; rec. in Scientific Library April 24, 1959.

IRVING L. SRAGOW, *Primary Examiner.*